(12) United States Patent
Krahn

(10) Patent No.: US 8,297,556 B2
(45) Date of Patent: Oct. 30, 2012

(54) WINDOW ELEMENT FOR INSERTION IN A WINDOW CUTOUT IN AN OUTER SKIN OF AN AIRCRAFT

(75) Inventor: Stefan Krahn, Osnabrück (DE)

(73) Assignee: Airbus Operations GmbH (DE)

( * ) Notice: Subject to any disclaimer, the term of this patent is extended or adjusted under 35 U.S.C. 154(b) by 820 days.

(21) Appl. No.: 11/990,366

(22) PCT Filed: Apr. 26, 2006

(86) PCT No.: PCT/EP2006/003878
§ 371 (c)(1),
(2), (4) Date: Feb. 8, 2008

(87) PCT Pub. No.: WO2007/016981
PCT Pub. Date: Feb. 15, 2007

(65) Prior Publication Data
US 2009/0084900 A1    Apr. 2, 2009

(30) Foreign Application Priority Data

Aug. 8, 2005 (DE) .......................... 10 2005 037 827
Dec. 8, 2005 (DE) .......................... 10 2005 058 749

(51) Int. Cl.
*B64C 1/14* (2006.01)

(52) U.S. Cl. .................................... 244/129.3; 244/132

(58) Field of Classification Search ............... 244/129.3, 244/121, 131, 132; 52/786.1, 788.1
See application file for complete search history.

(56) References Cited

U.S. PATENT DOCUMENTS

| | | | | |
|---|---|---|---|---|
| 2,414,705 A * | 1/1947 | Ames | .............................. | 296/201 |
| 2,613,402 A * | 10/1952 | Gouge | ............................ | 52/507 |
| 4,324,373 A * | 4/1982 | Zibritosky | .................... | 244/121 |
| 4,793,108 A * | 12/1988 | Bain et al. | ....................... | 52/208 |
| 5,271,581 A * | 12/1993 | Irish | ........................... | 244/129.3 |
| 5,884,865 A * | 3/1999 | Scherer et al. | ............. | 244/129.3 |
| 5,988,566 A * | 11/1999 | Meyer | ........................ | 244/129.3 |
| 6,168,112 B1 | 1/2001 | Mueller et al. | | |
| 6,736,352 B2 * | 5/2004 | Bladt et al. | .................. | 244/129.3 |
| 6,905,094 B2 * | 6/2005 | Dazet et al. | ................. | 244/129.3 |

(Continued)

FOREIGN PATENT DOCUMENTS

DE          198 06 106 C1    9/1999

(Continued)

OTHER PUBLICATIONS

Office Action from Russia Application No. 2008108485/11(009183), dated Oct. 26, 2009.

(Continued)

*Primary Examiner* — Philip J Bonzell
(74) *Attorney, Agent, or Firm* — Lerner, David, Littenberg, Krumholz & Mentlik, LLP

(57) ABSTRACT

A window element for insertion in a window cutout in an outer skin of an aircraft, with a window frame for accommodating a window package and a press-on frame. The window frame can be attached to the inside of the outer skin in the region of the window cutout and can be riveted to the external skin, wherein for attaching the press-on frame at least one press-on frame fitting is connected to the window frame and to the outer skin, in particular is riveted to the window frame and to the outer skin, and the window frame comprises an essentially L-shaped or rectangular cross-sectional geometric shape.

19 Claims, 3 Drawing Sheets

U.S. PATENT DOCUMENTS

Figure 1:
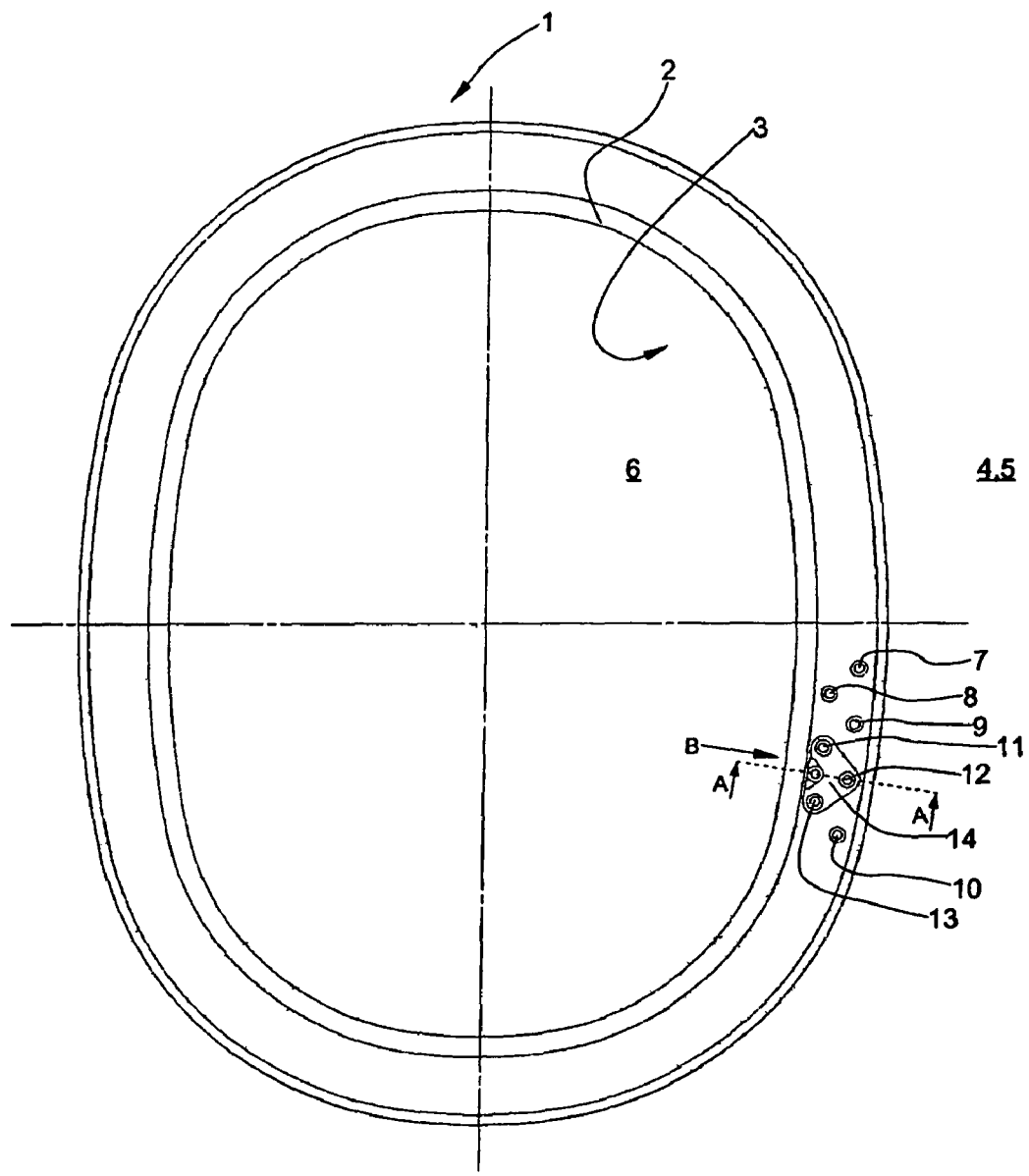

| | | | | |
|---|---|---|---|---|
| 7,118,070 | B2* | 10/2006 | Abrams et al. | 244/129.3 |
| 8,079,185 | B2* | 12/2011 | Paspirgilis | 52/204.62 |
| 2003/0234322 | A1* | 12/2003 | Bladt et al. | 244/129.3 |

FOREIGN PATENT DOCUMENTS

| | | |
|---|---|---|
| EP | 0 287 692 A1 | 10/1988 |
| EP | 0 936 138 A | 8/1999 |
| JP | 07-052890 A | 2/1995 |
| JP | 10036139 | 2/1998 |
| JP | 2003-034296 A | 2/2003 |
| JP | 2004-082955 A | 3/2004 |
| RU | 27049 U1 | 1/2003 |

OTHER PUBLICATIONS

Office Action from Japanese Application No. 2008-525396, dated Jul. 19, 2011.

* cited by examiner

WINDOW ELEMENT FOR INSERTION IN A WINDOW CUTOUT IN AN OUTER SKIN OF AN AIRCRAFT

REFERENCE TO RELATED APPLICATIONS

This application claims the benefit of the filing date of German Patent Application No. 10 2005 037 827.7 filed Aug. 8, 2005 and of German Patent Application No. 10 2005 058 749.6 filed Dec. 8, 2005, the disclosure of which applications is hereby incorporated herein by reference.

FIELD OF THE INVENTION

The present invention relates to a window element for insertion in a window cutout in an outer skin of an aircraft, with a window frame for accommodating a window package and a press-on frame.

TECHNOLOGICAL BACKGROUND

Known embodiments of window elements for passenger aircraft are constructed in a relatively complex manner. In particular, the window frame for accommodating the window package comprises a complicated essentially T-shaped cross-sectional area with an inclined web, which cross-sectional area due to the complex geometric shape as a rule is produced in a single piece in a forging process, for example made of aluminium. Furthermore, the use of the known window frames results in at least two aerodynamic interference edges in the outer skin of the fuselage airframe, as a result of which the air resistance or drag is increased. Furthermore, fixing a window package to the window frame by means of a press-on frame requires so-called eyebolts which in an additional production step are riveted to the window frame, wherein the alignment of said eyebolts, which alignment due to the production process is inevitably uneven, renders subsequent installation of the window package by means of the press-on frame difficult. Moreover, the complex geometric shape of the window frame makes it difficult to produce said window frame from fibre-reinforced composite materials.

SUMMARY OF THE INVENTION

Amongst other things, it may be an object of the present invention to create a window element for aircraft, in which the above-mentioned disadvantages can largely be avoided.

This object may be met by a window element with the characteristics of claim 1.

Since the window frame can be attached to the inside of the outer skin in the region of the window cutout, in particular can be riveted to the external skin, wherein for attaching the press-on frame at least one press-on frame fitting is connected to the window frame and to the external skin, in particular is riveted to the window frame and to the external skin, and the window frame comprises a simple cross-sectional geometric shape, in particular an essentially L-shaped or rectangular cross-sectional geometric shape, a constructively simple design of the window element according to the invention, in particular of the window frame, may result.

In a comparison with previously known solutions, with the same size of the window cutout the window element according to the invention may make it possible to create a larger window surface because the window frame no longer, or at most only slightly, protrudes into the window cutout and thus reduces its surface.

Furthermore, the simplified geometric shape of the window frame with an L-shaped or rectangular cross-sectional geometric shape may make it possible to economically produce the entire window element, if need be also with fibre-reinforced compound materials. Moreover, the window element according to the invention may make a simplified materials testing, and results in a reduced weight when compared to that of previously known solutions. Moreover, the design of the window seal of the window package is simplified because fewer sealing lips are required. Similarly, installation of the window element is facilitated because, during the installation process, the hitherto required eyebolts for installation of the window package or of the press-on frame need no longer be aligned, i.e. brought into a perpendicular position, in order to be able to slide the press-on frame into place for affixing the window package. According to the invention the threaded stay bolts of the press-on frame fittings are always aligned perpendicularly in relation to the window frame so that the press-on frame for tensioning the window package to the window frame can be placed without further ado over the threaded stay bolts and can be attached, for example by means of threaded nuts. Finally, the window element according to the invention means that there is now only one aerodynamic interference edge in the outer skin of the aircraft, as a result of which the flow resistance or drag is reduced.

In the region of the press-on frame fittings, said press-on frame fittings, together with the window frame, are firmly connected, in particular riveted, to the external skin. The window frame is, or the press-on frame fittings are, preferably riveted to the outer skin of the aircraft in at least two circumferential rows that are offset in relation to each other, in each case with the rivets spaced apart evenly in relation to each other in the edge-region of the window cutout.

According to another exemplary embodiment, the at least one press-on frame fitting comprises a stop face for the window package. In this way the window package may be guided or aligned within the window frame during installation.

According to a further exemplary embodiment, the at least one press-on frame fitting is made in one piece and comprises at least one connection element, in particular at least one threaded stay bolt, wherein the at least one connection element is aligned so as to be essentially perpendicular to the window frame.

The single-piece design of the press-on frame fitting firstly may make possible an easy and economical production of the same on known automatic production machines. The connection element, of which there is preferably one in the shape of a threaded stay bolt arranged so as to be perpendicular on the press-on frame fitting, facilitates installation of the window package because, for the purpose of tensioning the window package, the press-on frame with the drill holes correspondingly arranged therein can be slid onto the threaded stay bolts without further alignment work.

In accordance with a further embodiment of the invention, in each case the at least one press-on frame fitting is connected, by way of at least two connection elements, in particular at least two rivets, to the window frame and to the outer skin.

A riveted connection produced in this way results in tilt-proof attachment of the press-on frame fitting to the window frame or to the outer skin of the aircraft.

According to a further exemplary embodiment of the invention at least two press-on frame fittings are arranged on the window frame, which are substantially spaced in equidistant relation to each other. This may result in statically even tensioning of the window package to the window frame by way of the press-on frame. In a specific embodiment of the window element six press-on frame fittings are arranged, spaced apart so as to be equidistant from each other, around the circumference of the window frame.

In accordance with a further exemplary embodiment of the window element the window package comprises an internal window pane and an external window pane, wherein the internal window pane and the external window pane are bordered or enclosed by a window seal. In this way the formation of condensation in the region of the window panes may be largely avoided. Furthermore, the thermal insulation behaviour of the window element improves.

A further embodiment provides for the stop face of the at least one press-on frame fitting to be approximately parallel in relation to an external surface of the window seal, and to extend so as to be essentially perpendicular in relation to the window frame. This results in safe guidance of the window package during its installation. According to a specific embodiment, there is little distance between the external surface of the window seal and the respective stop faces of the press-on frame fittings so as to provide the option of tolerance equalisation during installation and operation.

According to a further exemplary embodiment the window frame comprises a circumferential supporting surface for the window package. In this way the window package is self-centering within the window frame during tensioning using the press-on frame.

Further exemplary embodiments of the arrangement are disclosed in the additional claims.

SHORT DESCRIPTION OF THE DRAWINGS

Figure 2:
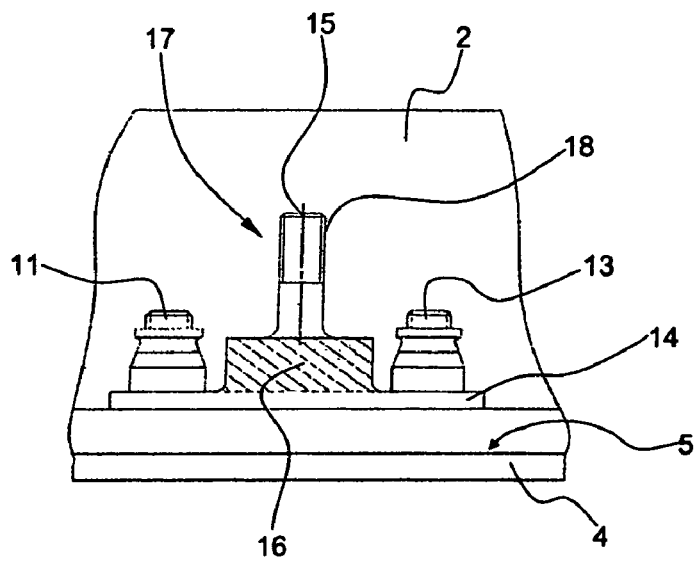
Figure 3:
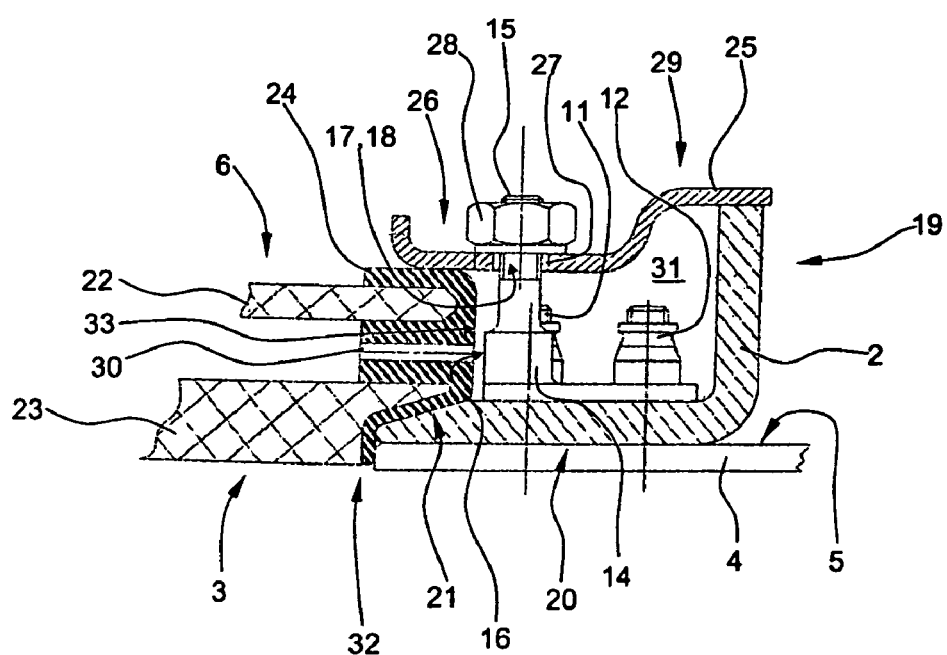
Figure 4:
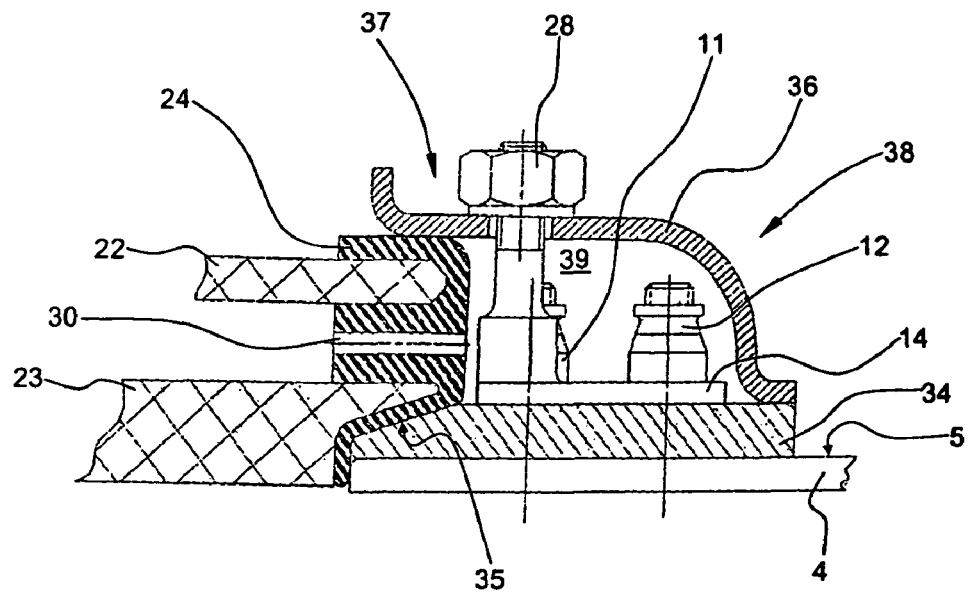
Figure 5:
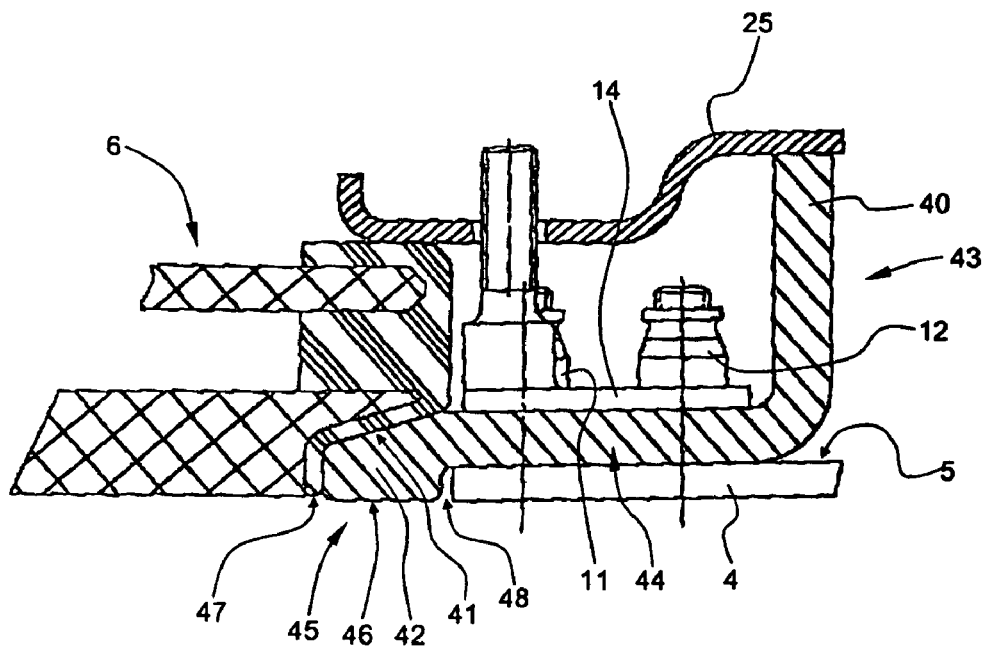

The present invention is described in greater detail below with reference to the enclosed figures. In the drawings:

FIG. 1 shows a top view of the window element from the direction of installation (interior of the fuselage airframe), FIG. 2 shows a press-on frame fitting, viewed from direction B, FIG. 3 shows a cross-section of a first embodiment of the window element, FIG. 4 shows a cross-section of a second embodiment of the window element, and FIG. 5 shows a cross-section of a third embodiment of the window element.

Identical or similar components are identified by the same reference symbols in all figures. The figures show schematic representations that are not true-to-scale.

DETAILED DESCRIPTION OF EXEMPLARY EMBODIMENTS

FIG. 1 shows a top view of the window element according to the invention from the direction of installation, in other words viewed from the inside of the fuselage airframe.

A window element 1 comprises among other things a window frame 2, which encloses a window cutout 3 in an outer skin 4 of the fuselage airframe of an aircraft. The window frame 2 rests against the inside 5 of the outer skin 4. To complete the window element 1 a window package 6 is accommodated in the window frame 2. In the embodiment shown, the window frame 2 is connected to the external skin 4 of the aircraft by way of a multitude of attachment elements, for example rivets, of which for the sake of providing improved clarity in the drawing the rivets 7 to 13 are shown so as to be representative for all the remaining rivets. In this arrangement, the rivets 7 to 13 are for example arranged in two rows that extend so as to be parallel in relation to each other, wherein the rivets 7 to 13 in the rows are in each case positioned around the circumference of the window frame 2 so as to be approximately equidistant to each other.

By means of the rivets 11 to 13, at the same time a press-on frame fitting 14 is connected to the window frame 2 and to the outer skin 4. Around the circumference of the window frame 2 a total of five other press-on frame fittings (not shown) are arranged, preferably spaced apart from each other so as to be equidistant, which press-on frame fittings are designed in the same manner as the press-on frame fitting 14, and are connected to the window frame 2 and to the outer skin 4 by means of rivets. In a way that differs from that of the described embodiment of the window element 1 which comprises a total of six press-on frame fittings, it is also possible to provide 2, 3, 4, 5 or 7 and more press-on frame fittings.

Instead of by means of rivets, the window frames 2 and the press-on frame fitting 14 and the remaining press-on frame fittings can also be connected to the inside 5 of the outer skin 4 for example by means of an adhesive connection or the like.

FIG. 2 shows a press-on frame fitting 14 viewed from direction B (cf. FIG. 1).

Among other things the press-on frame fitting 14 comprises a threaded stay bolt 15 as a connection element for a press-on frame, as well as a stop face 16. The stop face 16 is in particular used for guiding the window package 6 within the window frame 2. The press-on frame fitting 14 is preferably designed in one piece and can for example be made from a solid material by metal-removing production processes. For example aluminium, aluminium alloys, titanium, titanium alloys, steel or steel alloys may be considered as materials for the press-on frame fitting 14. As an alternative, the press-on frame fitting 14 can also be made with the use of fibre-reinforced plastic materials, for example in the injection moulding process or in the resin transfer moulding (RTM) process. In an end region 17 the threaded stay bolt 15 comprises a threaded section 18 to which suitable attachment elements, for example threaded nuts or the like, can be applied. The press-on frame fitting 14 rests against the top of the window frame 2, which in turn rests against the inside 5 of the outer skin 4 of the fuselage airframe of the aircraft.

Apart from other rivets (not shown in FIG. 2), the rivets 11, 13 are essentially used to firmly connect the press-on frame fitting 14 and the window frame 2 to the outer skin 4 of the fuselage airframe of the aircraft.

FIG. 3 shows a cross-section of the window element 1 along the section line A-A, wherein for the sake of improved clarity the rivet 13 has been left out.

The window-frame 2 rests against the inside 5 of the external skin 4 of the fuselage airframe. The window frame 2 or the press-on frame fitting 14 is connected to the outer skin 4 of the fuselage airframe by way of the rivets 11 and 12 as well as by way of the rivet 13 (not shown). The window frame 2 comprises a simple essentially L-shaped cross-sectional geometric shape with a first side 19 and a second side 20. The first side 19, which is approximately perpendicular in relation to the outer skin 4 of the aircraft, is in particular used to increase the rigidity of the window element 1. Furthermore, the window frame 2 comprises a circumferential supporting surface 21 to rest against and to centre the window package 6. To this effect the supporting surface 21 is inclined in the direction of the window cutout 3, i.e. it is conical in design, so that the window package 6 is self-centring.

The window packet 6 comprises an internal window pane 22 and an external window pane 23 that are enclosed by a window seal 24 so as to provide a hermetic seal. Furthermore, for attaching the window package 6 in the window frame 2 a press-on frame 25 is provided. A first section 26 of the press-on frame 25 comprises a drill hole 27, through which at least the end region 17 of the threaded stay bolt 15 with its threaded section 18 can be fed. By means of a threaded nut 28 as an attachment element the press-on frame 25 can be connected to the press-on frame fitting 14. The press-on frame 25 comprises another five drill holes through which the threaded stay bolts of the remaining five press-on frame fittings can be fed accordingly so that the press-on frame 25 can be tensioned to the window frame 2 for securing the window package 6 between the press-on frame 25 and the window frame 2 by means of a further five threaded nuts. As a result of this a second section 29 of the press-on frame 25 is supported by the first side 19 of the window frame 2. The press-on frame fittings are preferably distributed around the circumference of the window frame 2 so that they are arranged approximately equidistant in relation to each other.

Although the first section 26 and the second section 29 of the press-on frame are not aligned in the embodiment shown in FIG. 3, both sections 26, 29 may be aligned with respect to each other. In this case it may be necessary to shorten the length of the first side 19 of the window frame 2.

The threaded stay bolt 15 is aligned so as to be essentially perpendicular in relation to the second side 20 of the window frame 2 or to the outer skin 4 of the fuselage airframe. During installation of the window element 1 according to the invention first the window frame 2 is connected to the outer skin 4 by way of a multitude of rivets. During the riveting procedure the press-on frame fittings are riveted on as well at the same time. Subsequently the window package 6 is placed onto the supporting surface 21 of the window frame 2 and is aligned. In this arrangement the alignment of the window package 6 is essentially by means of the stop faces of the press-on frame fittings, which stop faces are approximately perpendicular. Due to the threaded stay bolts, which are always aligned so as to be essentially perpendicular, to complete the installation process the press-on frame 25 can be placed onto the threaded stay bolts 15 without prior alignment, and for tensioning the window package 6 between the press-on frame 25 and the window frame 2, said press-on frame 25 can simply be screwed tight by means of the threaded nuts 28. In this way the window element according to the invention can be installed in a simple and time-saving manner in a window cutout 3 in the outer skin 4 of a fuselage airframe of an aircraft, in particular of a passenger aircraft.

Furthermore, at least one ventilation duct 30 has been incorporated in the window seal 24. The press-on frame 25, in conjunction with the window seal 24 and the window frame 2, forms a circumferential hollow space 31 which is closed off, which hollow space 31 in conjunction with the ventilation duct 30 is used to ventilate the external window pane 23.

In order to drain condensed water eventually occurring within hollow space 31, the press-on frame 25 may be provided with a drainage opening (not shown) at its lowest portion through with opening the condensed water may be discharged.

Moreover, FIG. 3 shows that only one external (aerodynamic) interference edge 32 results between the outer skin 4 and the external window pane 23 so that the window element according to the invention hardly has a negative effect on the aerodynamic characteristics of the outer skin of the fuselage airframe of the aircraft.

The stop face 16, or the remaining five stop faces, are essentially used to guide or align the window package 6, together with the window seal 24 that encloses said window package 6, within the window element 1 during installation and during operation. In this arrangement there is a small space between the stop face 16 and a circumferential external surface 33 of the window seal 24 so as to provide the option of equalising the tolerances. In an alternative embodiment this distance can be reduced to a value of zero. Furthermore, the design can be such that a light press fit is provided between the supporting surfaces of the press-on frame fittings or the stop face 16 and the window seal 24 of the window package 6.

FIG. 4 shows a cross-section of a second embodiment of the window element according to the invention.

In a way that differs from the situation of the window frame 2 of the embodiment according to FIG. 3 a window frame 34 now comprises an essentially rectangular cross-sectional geometric shape, as a result of which the production of the window element is still further simplified. Due to the absence of a vertical side of the window frame 34 the mechanical rigidity achieved is less than that of the first embodiment variant of the window element. The window frame 34 again comprises a circumferential supporting surface 35, which for the purpose of centering the window package 6 is also of conical design, wherein the window frame 34 rests against the inside 5 of the outer skin 4 of the fuselage airframe. The press-on frame fitting 14 is designed in the same way as that of the first embodiment variant and is connected to the outer skin 4 by means of rivets 11 to 13 so that in this regard reference is made to the description provided in the context of FIG. 3.

In a way that is different to that of the first embodiment variant (cf. FIG. 3) with two essentially flat sections 26, 29 that are offset in relation to each other, one press-on frame 36 comprises a first section 37 which is joined to a second curved section 38. When the threaded nuts 28 are tightened, the window seal 24 of the window package 6 is pressed, by the press-on frame 36, against the supporting surface 35 and is thus tightly hermetically tensioned to the window frame 34. The first section 37 of the press-on frame 36 is essentially supported by the window seal 24 while its second section 38 is supported directly by the flat window frame 34, which, apart from the conical supporting surface 35, comprises a rectangular cross-sectional geometric shape.

The press-on frame 36, together with window seal 24 and the window frame 34, again forms a hollow space 39 which in connection with the ventilation duct 30 is used to ventilate the external window pane 23 or the internal window pane 22 of the window element.

FIG. 5 shows a further embodiment of the window element 1 according to the invention.

In contrast to the window frames 2 and 34 of the window element 1 according to FIGS. 3, 4, a window frame 40 comprises a downward or outward pointing thickened part 42 below an inclined (conical) supporting surface 41 for the window package 6. A first side 43 of the window frame 40, which comprises an approximately L-shaped cross-sectional geometric shape, is designed correspondingly to the embodiment of the window frame 2 according to FIG. 3 and extends so as to be essentially perpendicular in relation to the outer skin 4 of the fuselage airframe. A second side 44 of the window frame 40, which side 44 rests against the inside 5 of the outer skin 4, is longer than that in the embodiment of the window frame 2 according to FIG. 3 so that one end region 45 with the thickened part 42 protrudes somewhat into the window cutout 3.

As a result of this a window package 6 with a slightly reduced window area can be accommodated in the window frame 40 because the thickened part 42 or the end region 45 of the second side 44 with the supporting surface 41 slightly protrudes into the window cutout 3. In this arrangement a surface with a thickened part 46 of the thickened part 42 of the window frame 40 finishes so as to be approximately flush with the window package 6 and the outer skin 4 of the fuselage airframe. Apart from two interference edges 47, 48, this results in an essentially smooth outer skin 4 without any significant elevations or indentations, as a result of which the generation of aerodynamically unfavourable turbulence is largely avoided.

Among other things this embodiment of the window frame 40 facilitates painting, coating or the like of the outer skin 4 of the fuselage airframe of the aircraft because, as a rule, the surface with a thickened part 46 has been provided with a paint layer as well as a protective foil already in the factory so that masking the window package 6 prior to carrying out any painting of the outer skin 4 is no longer required.

Moreover, the thickened part 42 improves the mechanical properties, in particular the torsional rigidity, of the window frame 40 and thus of the entire window element 1.

In a way that is analogous to that of the description in the context of FIG. 3, the window package 6 is again pressed or pushed against the window frame 40 by means of the press-on frame 25, the press-on frame fitting 14, as well as a threaded nut (for the sake of improved clarity not shown in the drawing).

The window frame 40 itself is firmly connected to the external skin 4 of the fuselage airframe by means of a multitude of rivets, of which only the rivets 11, 12 are shown so as to be representative of the remaining rivets in FIG. 5.

In a further embodiment (not shown in detail) the window frame can have an essentially rectangular cross-sectional geometric shape, while maintaining the thickened part 42 shown in FIG. 5, corresponding to the embodiment of the window frame 34 in FIG. 4. In this case attachment of the window package 6 is by means of a press-on frame which has the same cross-sectional geometric shape as the press-on frame 36 shown in FIG. 4.

REFERENCE LIST

1 Window element
2 Window frame
3 Window cutout
4 Outer skin (fuselage airframe)
5 Inside
6 Window package
7 Rivet
8 Rivet
9 Rivet
10 Rivet
11 Rivet
12 Rivet
13 Rivet
14 Press-on frame fitting
15 Threaded stay bolt
16 Stop face
17 End region
18 Threaded section
19 First side (window frame)
20 Second side (window frame)
21 Supporting surface
22 Internal window pane
23 External window pane
24 Window seal
25 Press-on frame
26 First section (press-on frame)
27 Drill hole
28 Threaded nut
29 Second section (press-on frame)
30 Ventilation duct
31 Hollow space
32 Interference edge
33 External surface (window seal)
34 Window frame
35 Supporting surface
36 Press-on frame
37 First section
38 Second section
39 Hollow space
40 Window frame
41 Supporting surface
42 Thickened part
43 First side
44 Second side
45 End region
46 Surface with a thickened part
47 Interference edge
48 Interference edge

What is claimed is:

1. A window element for insertion in a window cutout in an outer skin of an aircraft, comprising:
a window frame for accommodating a window package,
a press-on frame; and
a plurality of press-on frame fittings,
wherein the window frame is attachable to the inside of the outer skin in the region of the window cutout,
wherein, for attaching the press-on frame, the plurality of press-on frame fittings are connected to the window frame and to the outer skin via a plurality of common fasteners connected to the outer skin,
wherein the window frame comprises one of a substantially L-shaped or rectangular cross-sectional geometric shape,
wherein the window frame has a first surface for resting against the inside of the outer skin and a second substantially flat surface opposite and substantially parallel to the first surface resting against the press-on frame fittings, and
wherein the press-on frame comprises a section in contact engagement with a side of the window frame.

2. A window element for insertion in a window cutout in an outer skin of an aircraft, comprising:
a window frame for accommodating a window package,
a press-on frame; and
a plurality of press-on frame fittings,
wherein the window frame is attachable to the inside of the outer skin in the region of the window cutout,
wherein, for attaching the press-on frame, the plurality of press-on frame fittings are connected to the window frame and to the outer skin via a plurality of common fasteners connected to the outer skin,
wherein the window frame comprises one of a substantially L-shaped or rectangular cross-sectional geometric shape,
wherein the window frame has a first region with a first surface for resting against the inside of the outer skin and a second surface opposite and substantially parallel to the first surface resting against the press-on frame fitting,
wherein the first region is arranged between the outer skin of the aircraft and the press-on fitting and comprises at least one recess for allowing the press-on frame fitting to connect to the outer skin using at least one fastener, and
wherein the press-on frame comprises a section in contact engagement with a side of the window frame.

3. A window element for insertion in a window cutout in an outer skin of an aircraft, comprising:
a window frame for accommodating a window package,
a press-on frame; and
a plurality of press-on frame-fittings, wherein the window frame is attachable to the inside of the outer skin in the region of the window cutout, wherein, for attaching the press-on frame, the plurality of press-on frame-fittings are connected to the window frame and to the outer skin via a plurality of common fasteners generally perpendicular to and connected to the outer skin, wherein the window frame comprises one of a substantially L-shaped or rectangular cross-sectional geometric shape, wherein the window frame has a first surface for resting against the inside of the outer skin and a second surface opposite and substantially parallel to the first surface resting against the press-on frame fittings, and wherein the press-on frame comprises a section in contact engagement with a side of the window frame.

4. The window element of claim 3, wherein at least a first and a second of the plurality of press-on frame fittings are arranged on the window frame at substantially equidistant spacing in relation to each other.

5. The window element of claim 3, wherein each of the plurality of press-on frame fittings has a substantially V-shaped configuration.

6. The window element of claim 3, wherein each of the plurality of press-on frame fittings comprises a stop face for the window package.

7. The window element of claim 6, wherein the stop face of each press-on frame fitting is substantially parallel in relation to an external surface of the window seal, and extends so as to be substantially perpendicular in relation to the window frame.

8. The window element of claim 3, wherein each of the plurality of press-on frame fittings is connected, by way of at least a first and a second common fasteners to the window frame and to the outer skin.

9. The window element of claim 8, wherein said first and second common fasteners comprise a first and a second rivet, respectively.

10. The window element of claim 3, wherein the window frame comprises a circumferential supporting surface for the window package.

11. The window element of claim 10, wherein the supporting surface is conical.

12. The window element of claim 3, wherein each of the plurality of press-on frame fittings comprises at least one first connection element made in one piece with the press-on fitting and aligned so as to be substantially perpendicular to the window frame for connecting to the window frame.

13. The window element of claim 12, wherein the window package is tensioned by way of the press-on frame to the window frame by at least one attachment element that can be placed on the at least one connection element.

14. The window element of claim 12, wherein said at least one connection element comprises a threaded stay bolt.

15. The window element of claim 12, wherein the press-on frame comprises at least one recess for feeding-through the at least one connection element.

16. The window element of claim 15, wherein said at least one recess comprises a drill hole.

17. The window element of claim 3, wherein the window package comprises an internal window pane and an external window pane, wherein the internal window pane and the external window pane are enclosed by a window seal.

18. The window element of claim 17, wherein the window frame and the press-on frame as well as the window seal form a hollow space for ventilating the window package.

19. The window element of claim 17, wherein the window seal comprises at least one ventilation duct for ventilating the external window pane.

* * * * *